United States Patent
Ha et al.

(10) Patent No.: US 12,494,656 B2
(45) Date of Patent: Dec. 9, 2025

(54) CHARGE AND STORAGE SYSTEM OF RENEWABLE ENERGY TRANSPORTATION

(71) Applicants: HYUNDAI MOTOR COMPANY, Seoul (KR); Kia Corporation, Seoul (KR)

(72) Inventors: Dong Hyun Ha, Seoul (KR); Jung Hun Choi, Hwaseong-si (KR); Jae Wung Jung, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 772 days.

(21) Appl. No.: 17/870,239

(22) Filed: Jul. 21, 2022

(65) Prior Publication Data
US 2023/0256850 A1    Aug. 17, 2023

(30) Foreign Application Priority Data

Feb. 14, 2022    (KR) .................. 10-2022-0019183

(51) Int. Cl.
| | |
|---|---|
| H02J 7/00 | (2006.01) |
| B60L 53/12 | (2019.01) |
| B60L 53/30 | (2019.01) |
| B60L 53/60 | (2019.01) |
| B64U 50/30 | (2023.01) |
| B64U 50/37 | (2023.01) |
| H02J 3/38 | (2006.01) |
| H02J 50/10 | (2016.01) |
| B64F 1/36 | (2017.01) |
| B64U 80/00 | (2023.01) |
| H02J 3/32 | (2006.01) |

(52) U.S. Cl.
CPC ............ *H02J 7/0042* (2013.01); *B60L 53/12* (2019.02); *B60L 53/30* (2019.02); *B60L 53/60* (2019.02); *B64U 50/30* (2023.01); *B64U 50/37* (2023.01); *H02J 3/381* (2013.01); *H02J 50/10* (2016.02); *B60L 2200/10* (2013.01); *B60L 2200/32* (2013.01); *B64F 1/362* (2013.01); *B64U 80/00* (2023.01); *H02J 3/322* (2020.01); *H02J 7/0013* (2013.01); *H02J 2300/20* (2020.01)

(58) Field of Classification Search
CPC ..................................................... H02J 7/0042
See application file for complete search history.

(56) References Cited

U.S. PATENT DOCUMENTS

| | | | |
|---|---|---|---|
| 2005/0051667 A1* | 3/2005 | Arlton ............. | G08B 13/19621 |
| | | | 244/17.11 |
| 2016/0304217 A1* | 10/2016 | Fisher .................. | G05D 1/0011 |

* cited by examiner

*Primary Examiner* — Robert Grant
(74) *Attorney, Agent, or Firm* — Morgan, Lewis & Bockius LLP

(57) ABSTRACT

A charging and storage system for a renewable energy transportation, may include a transportation configured to transfer renewable energy; and a cabin configured to charge and store the transportation, wherein the cabin includes a support portion for supporting the transportation, an accommodation portion formed in at least a part of the support portion to accommodate the transportation therein, and a charging unit provided in the accommodation portion to charge the transportation using the renewable energy, and wherein the transportation includes a body portion to be selectively inserted in the accommodation portion, and a wing portion coupled to the body portion to move the body portion.

13 Claims, 5 Drawing Sheets

CHARGE AND STORAGE SYSTEM OF RENEWABLE ENERGY TRANSPORTATION

CROSS-REFERENCE TO RELATED APPLICATION

The present application claims priority to Korean Patent Application No. 10-2022-0019183, filed on Feb. 14, 2022, the entire contents of which is incorporated herein for all purposes by this reference.

BACKGROUND OF THE PRESENT DISCLOSURE

Field of the Present Disclosure

The present disclosure relates to a charging and storage system for a renewable energy transportation.

DESCRIPTION OF RELATED ART

The content described in the present section merely provides background information for the present disclosure and does not form the related art.

In accordance with the current atmosphere that values resource depletion, safety issues, and eco-friendly values, the proportion of renewable energy is increasing as an alternative to three major power generations such as thermal power, hydroelectric power, and nuclear power. Renewable energy includes power generation using infinite energy sources such as solar power, solar heat, tidal power, wave power, wind power, and geothermal heat.

More than 70% of the earth's surface is the sea, and in particular, Korea is surrounded by sea on three sides and has a good environment to use the infinite energy of the sea, so domestic interest in wave power generation is increasing. Wave power generation refers to a power generation method that produces electrical energy using the periodic up and down motion of the water surface caused by waves.

In the case of large-scale wave power generation, there is a spatial limit to installing a wave power plant on a shoreline adjacent to the ground. Furthermore, when the wave power plant is provided in the coastal waters and distant seas, energy transfer is difficult and expensive submarine cables are required, which results in costs.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a charging and storage system for transferring a renewable energy transportation, the system including: a transportation configured to transfer renewable energy; and a cabin configured to charge and store the transportation, wherein the cabin includes a support portion for supporting the transportation, an accommodation portion formed in at least a part of the support portion to accommodate the transportation therein, and a charging unit provided in the accommodation portion to charge the transportation using the renewable energy, and wherein the transportation includes a body portion to be inserted into the accommodation portion, and a wing portion coupled to the body portion to move the body portion.

According to another aspect, the present disclosure provides a charging and storage method for a renewable energy transportation, the method including: moving a transportation for transferring renewable energy to a cabin configured to charge and store the transportation; determining whether the transportation has landed in the cabin; fixing the transportation to the cabin; and charging the transportation using renewable energy.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
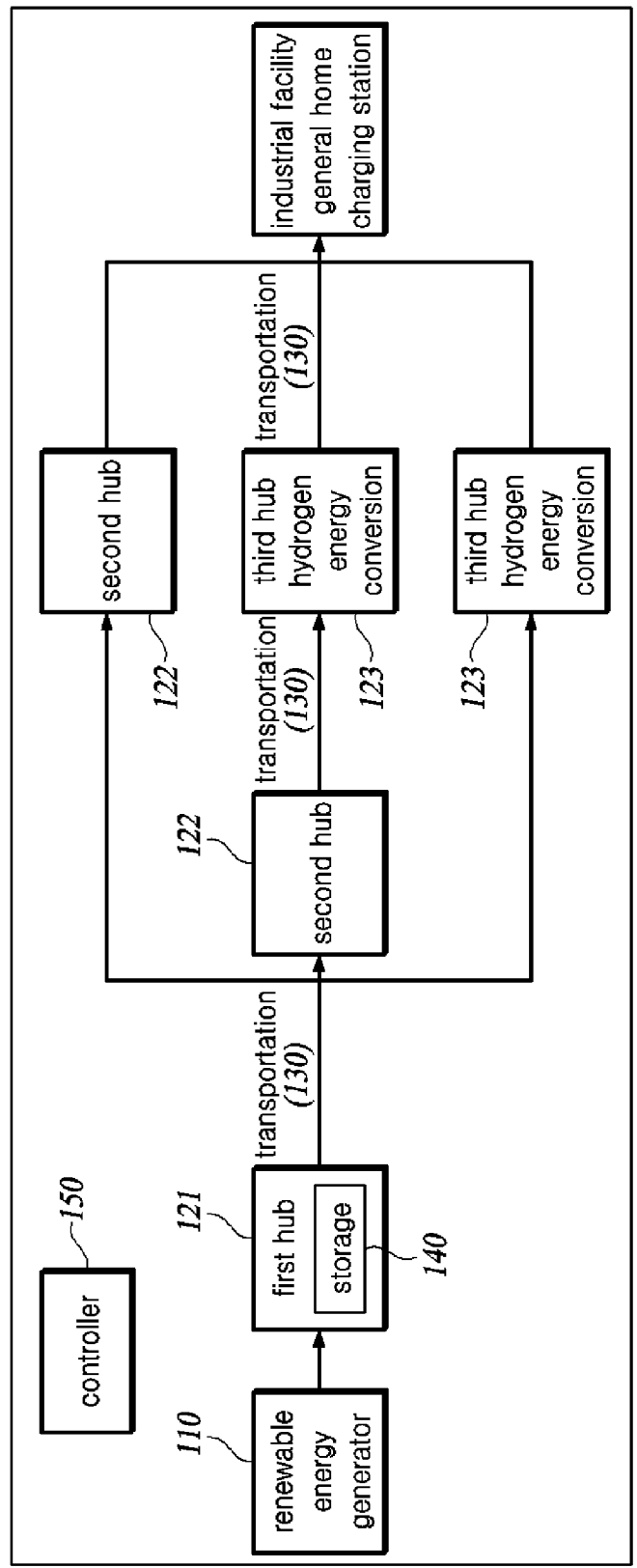
FIG. 1 is a block diagram of a renewable energy power generation system including a charging and storage system for a renewable energy transportation according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In view of the above, the present disclosure provides a charging and storage system for a renewable energy transportation, which is configured for efficiently charging and storing the renewable energy transportation using a cabin for the transportation.

Furthermore, the present disclosure provides a charging and storage system for a renewable energy transportation, which is configured for efficiently transferring renewable energy produced in the coastal waters and distant seas by transporting a renewable energy storage using the transportation.

The object to be achieved by the present disclosure is not limited to the above-mentioned objects, and other objectives not mentioned will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Furthermore, in the following description of various exemplary embodiments of the present disclosure, a detailed description of known functions and configurations incorporated therein will be omitted for clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a block diagram of a renewable energy power generation system including a charging and storage system for a renewable energy transportation according to an exemplary embodiment of the present disclosure.

Referring to FIG. 1, a renewable energy generation system 100 may include all or a part of a renewable energy generator 110, a first hub 121, a second hub 122, a third hub 123, a transportation 130, a storage 140, and a controller 150.

A plurality of renewable energy generators 110 are connected to each other using a cable, and may float in the coastal waters and distant seas. The plurality of renewable energy generators 110 may have a roly poly capsule shape. Each of the renewable energy generators 110 may convert wave energy into electrical energy to generate electric power.

A solar panel may be provided on a surface of the renewable energy generator 110. The solar panel may be provided on an upper surface of the renewable energy generator 110, that is, a portion which is not submerged in seawater. The renewable energy generator 110 may not only convert wave energy into electrical energy, but also convert solar energy into electrical energy using the solar panel.

The first hub 121 may be positioned to be surrounded by the plurality of renewable energy generators 110. The first hub 121 may be connected to the plurality of renewable energy generators 110 by cables to receive electrical energy from the plurality of renewable energy generators 110. The first hub 121 may receive electrical energy from the plurality of renewable energy generators 110 and store electrical energy. The electrical energy transmitted to the first hub 121 may charge the transportation 130 and the storage 140 coupled to the first hub 121. In the instant case, the transportation 130 may be an unmanned aerial vehicle (UAV), an unmanned ship, a drone, or the like.

The second hub 122 may be positioned to be surrounded by a plurality of first clusters including the first hub 121. The third hub 123 may be positioned to be surrounded by a plurality of second clusters including the second hub 122.

The transportation 130 may transfer the storage 140 and the electrical energy between the first hub 121, the second hub 122, and the third hub 123. Furthermore, the transportation 130 may transmit the storage 140 and the electrical energy to the first hub 121, the second hub 122, the third hub 123, and a separate place located on the ground. Here, the separate place may be a future mobility such as an electric vehicle (EV), a purpose built vehicle (PBV), an urban air mobility (UAM), or a robot, a charging station, a general home, an industrial facility, and the like. For example, the remaining power may be used by connecting a rechargeable eco-friendly vehicle to a power grid using vehicle to grid (V2G) technology. By use of a method in which an eco-friendly vehicle is charged using a power grid and the remaining electricity is supplied to the power grid again after driving of the vehicle, the eco-friendly vehicle may become a moving energy storage system (ESS).

The renewable energy generation system 100 may convert electrical energy into hydrogen energy and transfer it. When energy is stored in the first hub 121, the second hub 122 and the third hub 123 for a long time period, a large amount of energy (1 TWh or more) may be stored. In the case of a large amount of energy, it is more suitable to store it as hydrogen energy than electrical energy. Furthermore, because hydrogen energy loses less energy than electrical energy during long-distance transport, it is suitable for transporting energy between countries.

Figure 2:
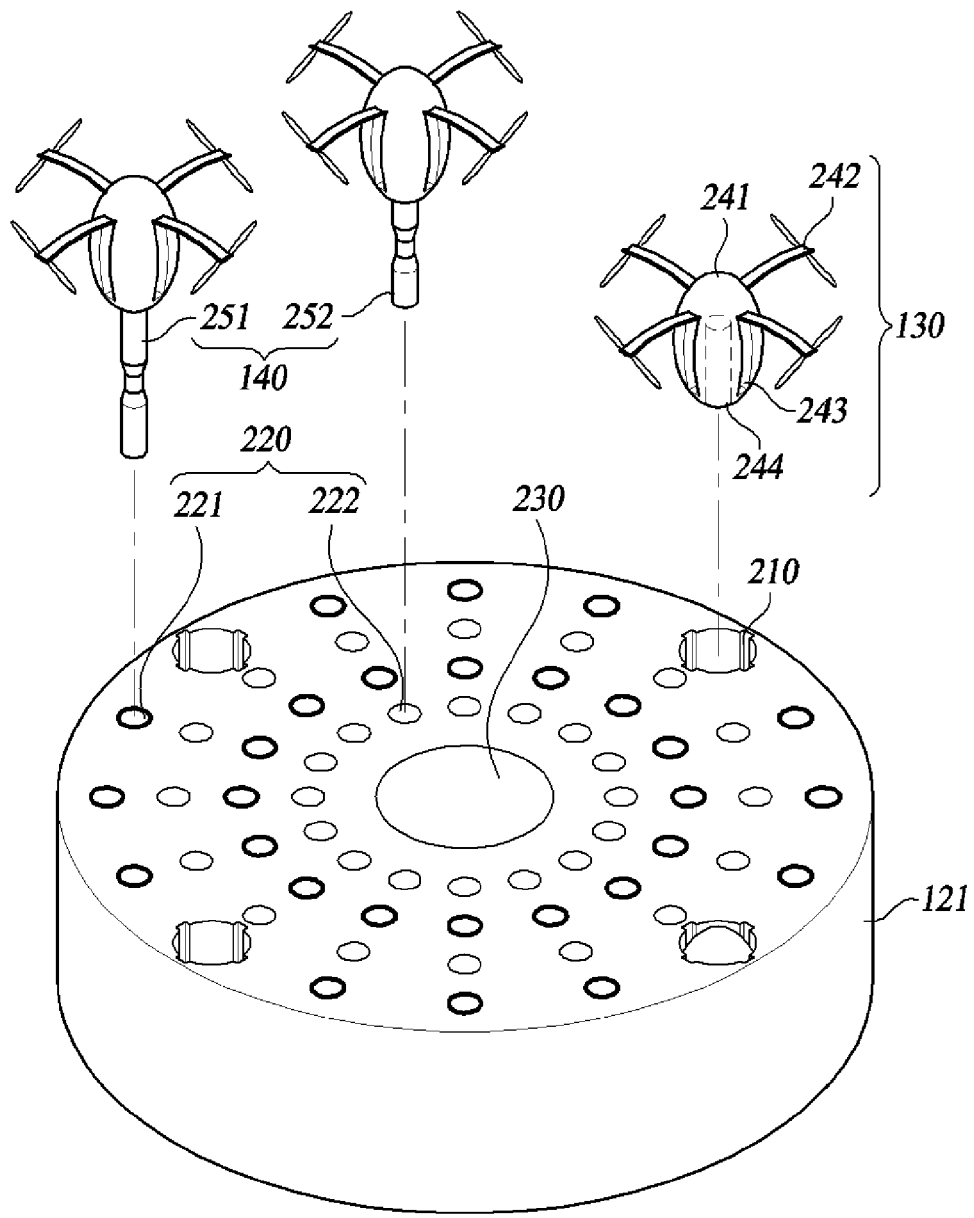
FIG. 2 is a view showing a configuration of the charging and storage system for a renewable energy transportation according to an exemplary embodiment of the present disclosure.

FIG. 2 is a view showing a configuration of a charging and storage system 200 for a renewable energy transportation according to an exemplary embodiment of the present disclosure.

Figure 3A:
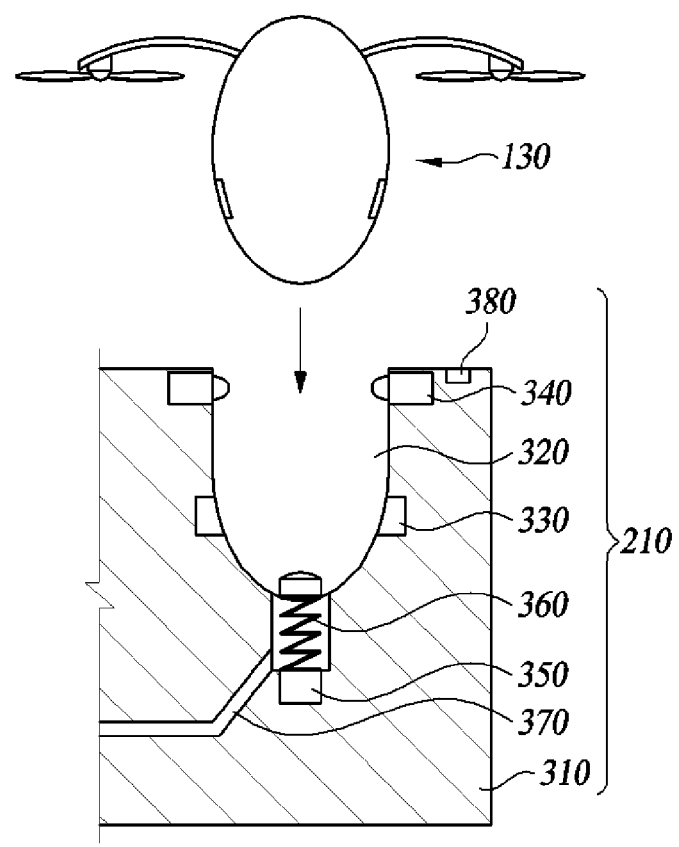
FIG. 3A and FIG. 3B are views showing a charging and storage principle for the renewable energy transportation according to an exemplary embodiment of the present disclosure.
Figure 3B:
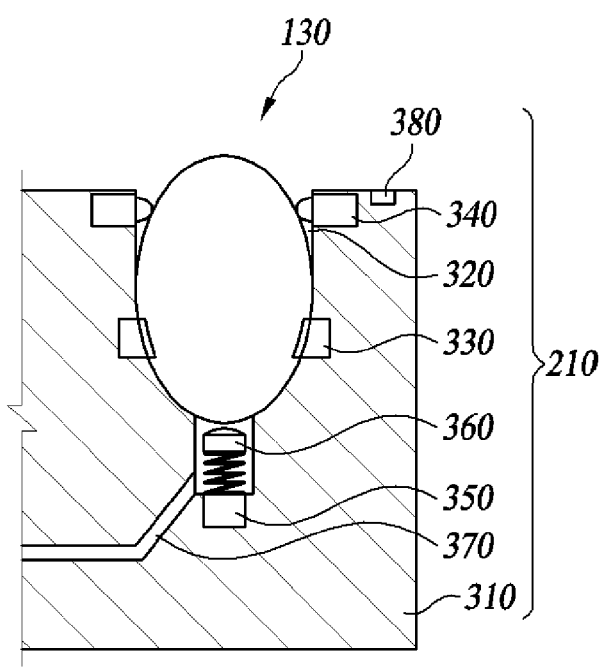

FIG. 3A and FIG. 3B are views showing a charging and storage principle for the renewable energy transportation according to an exemplary embodiment of the present disclosure.

FIGS. 2, 3A and 3B, the charging and storage system 200 for the renewable energy transportation according to an exemplary embodiment of the present disclosure may include the first hub 121, the transportation 130, and the storage 140.

The first hub 121 may include a cabin for transportation 210, a cabin for storage 220, and a storage place 230.

The cabin for transportation 210 may include a support portion 310, an accommodation portion 320, a charging unit 330, a locking unit 340, a sensor 350, a cushioning member 360, a drain 370, and a communication unit 380.

The charging unit 330 may include a plug, an insulator, and a cable.

The cabin for storage 220 may include a first cabin 221 and a second cabin 222.

The transportation 130 may include a body portion 241, a wing portion 242, a wing receptacle 243, and a storage receptacle 244.

The storage 140 may include a first storage 251 and a second storage 252.

Each of the first storage 251 and the second storage 252 may include a storing unit and a charging terminal.

The first hub 121 may receive and store renewable energy from the renewable energy generator 110. The first hub 121 may charge the transportation 130 and the storage 140 using the renewable energy. At least a part of the first hub 121 may be configured to charge and store the transportation 130 and/or the storage 140.

The cabin for transportation 210 is configured to charge and store the transportation 130. The cabin for transportation 210 may be formed in at least a part of the first hub 121. A plurality of cabins for transportation 210 may be provided. The cabin for transportation 210 may charge the transportation 130 using renewable energy. The cabin for transportation 210 may have both a circular or expandable concept in which a propeller or arm may fit.

The support portion 310 may be formed in at least a portion of the first hub 121 to support the transportation 130. The accommodation portion 320 is formed in at least a part of the support portion 310. The charging unit 330, the locking unit 340, the sensor 350, the cushioning member 360, and the communication unit 380 may be provided in the support portion 310. The drain 370 may be formed in the support portion 310.

The accommodation portion 320 is formed in the support portion 310 to accommodate at least a part of the transportation 130. The accommodation portion 320 may be recessed from the surface of the support portion 310. The accommodation portion 320 may accommodate the body portion 241 of the transportation 130. The charging unit 330, the locking unit 340, the sensor 350, and the cushioning member 360 may be provided in the accommodation portion 320. The drain 370 may be formed to extend from the inside of the accommodation portion 320 to the outside so that foreign substances in the accommodation portion 320 are discharged therethrough.

The charging unit 330 may be provided in the accommodation portion 320 to charge the transportation 130. The charging unit 330 may charge the transportation 130 using renewable energy transferred from the renewable energy generator 110. The charging unit 330 may be controlled by the controller 150 based on whether the transportation 130 lands on the cabin for transportation 210. The charging unit 330 may charge the transportation 130 using a wired or wireless charging method. Here, the wireless charging method refers to a magnetic induction method, a magnetic resonance method, and an electromagnetic wave method. However, the method of charging the transportation 130 by the charging unit 330 is not limited to the above-described method, and may be charged using another method in accordance with the purpose and use.

The locking unit 340 may be provided in the accommodation portion 320. When the transportation 130 lands in the accommodation portion 320, the locking unit 340 fixes the transportation 130 to the support portion 310. The locking unit 340 may include a plurality of air tubes. As the plurality of air tubes expand, the transportation 130 may be fixed to the support portion 310. Because the transportation 130 is fixed to the support portion 310, the transportation 130 may be stably charged and stored.

The sensor 350 may be provided at one end portion in the accommodation portion 320. The sensor 350 may detect whether the transportation 130 lands in the accommodation portion 320. A plurality of sensors 350 may be provided. Based on the information detected by the sensor 350, the controller 150 may control the charging unit 330, the locking unit 340, and the like.

The cushioning member 360 may be provided at one end portion in the accommodation portion 320. The cushioning member 360 may alleviate an impact which may occur when the transportation 130 lands in the accommodation portion 320. The cushioning member 360 may be a spring, a damper, or an air tube. When the cushioning member 360 is an air tube, the air tube may be controlled by the controller 150.

The drain 370 may be formed through at least a part of the support portion 310 to extend from the inside of the accommodation portion 320 to the outside. The inside of the accommodation portion 320 may be kept clean because rainwater and foreign substances inside the accommodation portion 320 are discharged to the outside through the drain 370.

The communication unit 380 communicates with the transportation 130 to obtain information on the transportation 130. The communication unit 380 may obtain information on a location of the transportation 130 and a distance between the transportation 130 and the cabin for transportation 210. The communication unit 380 may be provided at the support portion 310. The communication unit 380 may transmit the obtained information to the controller 150. The controller 150 may control the transportation 130 and the cabin for transportation 210 based on the information obtained by the communication unit 380. The communication unit 380 may communicate with the transportation 130 using an ultra-wide band (UWB) communication method or the like.

The cabin for storage 220 is configured to charge and store the storage 140 in which renewable energy is stored. The cabin for storage 220 may be formed in a portion of the first hub 121 and may be provided in plural. The cabin for storage 220 may include the first cabin 221 and the second cabin 222. The first cabin 221 may accommodate the first storage 251 formed to be relatively long, and the second cabin 222 may accommodate the second storage 252 formed to be relatively short.

The storage place 230 may be located in the center portion of the first hub 121. The transportation 130 such as a UAM, a UAV, and the like for transferring the storage 140 may be charged and stored in the storage place 230.

The transportation 130 may transfer the storage 140 which stores renewable energy from the first hub 121 to the second hub 122, the third hub 123, and a separate place. The transportation 130 may be configured to be coupled to at least a portion of the storage 140. The transportation 130 may be charged and stored by the cabin for transportation 210. The transportation 130 may be charged using renewable energy. The transportation 130 may communicate with the communication unit 380 to provide location and distance information to the communication unit 380. The transportation 130 may be a UAV, an unmanned ship, or a drone. A plurality of transportations 130 may be provided.

The body portion 241 may be inserted into the accommodation portion 320 of the cabin for transportation 210. One or more wing portions 242 may be provided at the body portion 241. The body portion 241 may be moved by the wing portion 242. The wing receptacle 243 and/or the storage receptacle 244 may be formed in at least a part of the body portion 241. When the transportation 130 lands in the accommodation portion 320, the body portion 241 may be fixed to the support portion 310 by the locking unit 340.

The wing portion 242 may be provided to the body portion 241 to move the body portion 241. The wing portion 242 may include one or more wings. At least a portion of the wing portion 242 may be formed to be bendable. When the bendable portion of the wing portion 242 is bent, the wing portion 242 may be inserted into the wing receptacle 243 formed on the body portion 241. As the wing portion 242 is inserted into the wing receptacle 243, the entire volume of the transportation 130 is reduced when the transportation 130 is charged and stored.

In an exemplary embodiment of the present invention, the wing portion 242 may be foldable with respect to the body portion 241 of the transportation 130, such that when the wing portion 242 is folded, the wing portion 242 may be inserted into the wing receptacle 243 formed on the body portion 241.

The wing receptacle 243 may be formed on at least a part of the body portion 241. The wing receptacle 243 may be recessed from the surface of the body portion 241. The wing portion 242 may be inserted into the wing receptacle 243. The wing receptacle 243 may be formed in a shape corresponding to a shape of the wing portion 242 to allow the wing portion 242 to be inserted therein.

The storage receptacle 244 may be formed in at least a part of the body portion 241. The storage receptacle 244 may be recessed from the surface of the body portion 241. At least a part of the storage 140 may be inserted into the storage receptacle 244. The storage receptacle 244 may be formed in a shape corresponding to the shape of the storage 140 so that the storage 140 is inserted. At least a part of the storage 140 is inserted into the storage receptacle 244 to safely transfer the storage 140.

The storage 140 is a member that stores renewable energy and may be charged and stored by the cabin for storage 220. The storage 140 may be coupled to the transportation 130. At least a portion of the storage 140 may be inserted into the storage receptacle 244 of the transportation 130. The storage 140 may be transferred by the transportation 130. The storage 140 may be configured to be removably inserted into the cabin for storage 220. The storage 140 may store energy generated by the renewable energy generator 110 in a form of electrical energy or hydrogen energy. The storage 140 may include the first storage 251 formed to be relatively long and the second storage 252 formed to be relatively short. The controller 150 may efficiently transfer renewable energy by determining the storage 140 to be transferred based on a distance from the cabin for storage 220 to a destination and a weather condition.

Referring back to FIG. 1, FIG. 2, and FIG. 3, the transportation 130 moves to the cabin for transportation 210 to be charged and stored. The transportation 130 lands in the accommodation portion 320. In the instant case, the impact between the transportation 130 and the support portion 310 may be alleviated by the cushioning member 360. The sensor 350 detects whether the transportation 130 lands in the accommodation portion 320. When the transportation 130 lands in the accommodation portion 320, the controller 150 controls using the locking unit 340 to fix the transportation 130 to the support portion 310. The controller 150 controls the charging unit 330 to charge the transportation 130.

Figure 4:
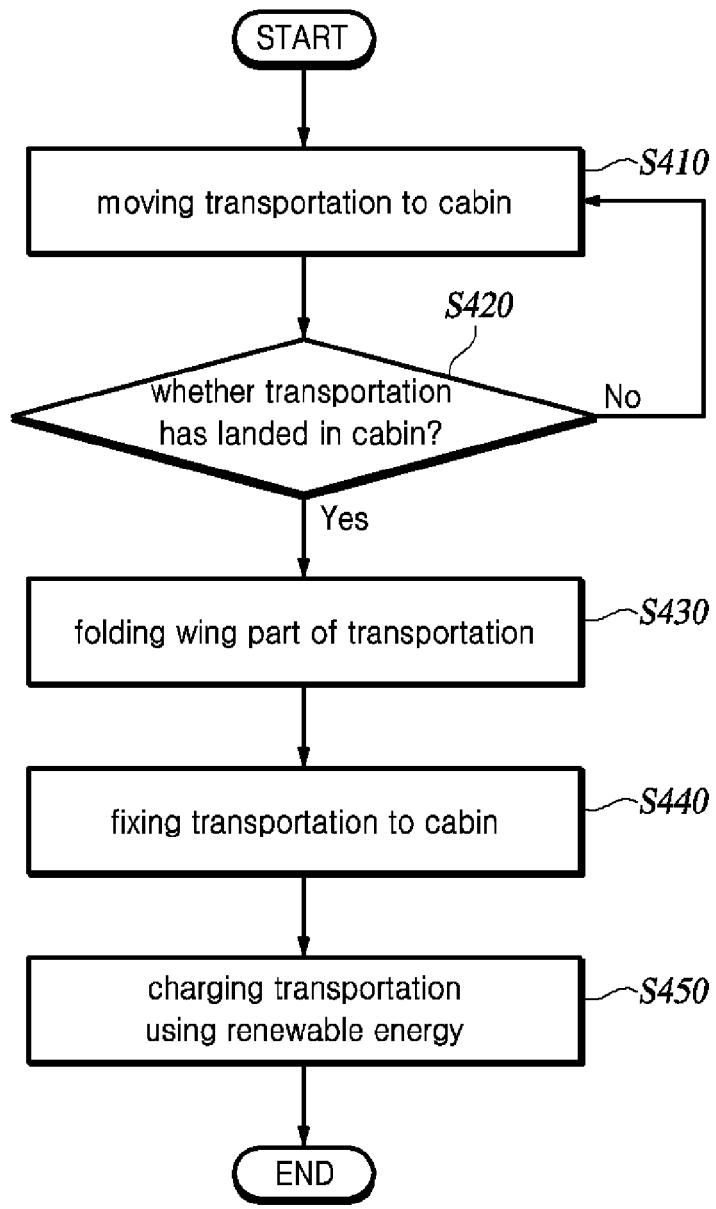
FIG. 4 is a flowchart of a charging and storage method for the renewable energy transportation according to an exemplary embodiment of the present disclosure.

FIG. 4 is a flowchart of a method of charging and storing the renewable energy transportation according to an exemplary embodiment of the present disclosure.

The method of charging and storing the renewable energy transportation according to an exemplary embodiment of the present disclosure will be described with reference to FIG. 4.

The transportation 130 moves to the cabin for transportation 210 (S410). The transportation 130 moves to the cabin for transportation 210 to be charged and stored. The controller 150 may control the transportation 130 to move to the cabin for transportation 210.

The controller 150 determines whether the transportation 130 has landed in the cabin for transportation 210 (S420). The controller 150 determines whether the transportation 130 lands in the accommodation portion 320 of the cabin for transportation 210 to be charged and stored. The controller 150 may determine whether the transportation 130 lands in the accommodation portion 320 based on information detected by the sensor 350 provided at one end portion in the accommodation portion 320.

The controller 150 controls the transportation 130 so that the wing portion 242 of the transportation 130 is folded (S430). When it is determined that the transportation 130 has landed in the cabin for transportation 210, the controller 150 controls the transportation 130 to fold the wing portion 242 of the transportation 130. The wing portion 242 may be fitted in the wing receptacle 243 of the transportation 130. As the wing portion 242 is fitted in the wing receptacle 243, the entire volume of the transportation 130 may be reduced.

The controller 150 fixes the transportation to the cabin for transportation 210 (S440). When the transportation 130 lands in the cabin for transportation 210, the controller 150 controls the locking unit 340 to fix the transportation 130 to the support portion 310. When the locking unit 340 includes a plurality of air tubes, the controller 150 may expand the plurality of air tubes to fix the transportation 130 to the cabin for transportation 210. Because the transportation 130 is fixed to the cabin for transportation 210, the transportation 130 may be stably charged and stored.

The charging unit 330 charges the transportation 130 using renewable energy (S450). The charging unit 330 charges the transportation 130 using renewable energy transferred from the renewable energy generator 110. The controller 150 may control the charging unit 330 to charge the transportation 130 using renewable energy.

According to an exemplary embodiment of the present disclosure, the charging and storage system for the renewable energy transportation can efficiently charge and store the renewable energy transportation using a cabin for the transportation.

According to an exemplary embodiment of the present disclosure, the charging and storage system for the renewable energy transportation can efficiently transfer renewable energy produced in the coastal waters and distant seas by transporting a renewable energy storage using the transportation.

Although it is described that the processes are sequentially executed in the flowchart of the present disclosure, this is merely illustrative of the technical idea of various exemplary embodiments of the present disclosure. In other words, because an ordinary skilled person in the art to which the exemplary embodiments of the present disclosure pertain may make various modifications and changes by changing the processes described in the flowchart/timing diagram or performing one or more of the processes in parallel without deportioning from the essential characteristics of the exemplary embodiments of the present disclosure, the flowchart/timing diagram is not limited to a time-series order.

Various implementations of the systems and techniques described herein may be realized by digital electronic circuits, integrated circuits, field programmable gate arrays (FPGAs), application specific integrated circuits (ASICs), computer hardware, firmware, software, and/or combination thereof. These various implementations may include an implementation by one or more computer programs executable on a programmable system. The programmable system includes at least one programmable processor (which may be a special purpose processor or a general-purpose processor) coupled to a storage system, at least one input device, and at least one output device to receive and transmit data and instructions therefrom and thereto. Computer programs (also known as programs, software, software applications or codes) include instructions for the programmable processor and are stored in a "computer-readable recording medium".

The computer-readable recording medium includes all types of recording devices in which data readable by a computer system is stored. The computer-readable recording medium may include non-volatile or non-transitory mediums such as ROM, RAM, CD-ROM, magnetic tape, floppy disk, memory card, hard disk, optical disk, and storage device, and may further include a temporary medium such as a data transmission medium. Furthermore, the computer-readable recording medium may be distributed in a network-connected computer system, and computer-readable codes may be stored and executed in a distributed manner.

Various implementations of systems and techniques described herein may be implemented by a programmable computer. Here, the computer includes a programmable processor, a data storage system (including a volatile memory, a nonvolatile memory, or another type of storage system or a combination thereof), and at least one communication interface. For example, a programmable computer may be one of a server, a network device, a set-top box, a built-in device, a computer expansion module, a personal computer, a laptop, a personal data assistant (PDA), a cloud determining system, and a mobile device.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A charging and storage system for a renewable energy transportation, the system comprising:
   a transportation configured to transfer renewable energy; and
   a cabin configured to charge and store the transportation,
   wherein the cabin includes a support portion for supporting the transportation, an accommodation portion formed in at least a part of the support portion to accommodate the transportation therein, a charging unit provided in the accommodation portion to charge the transportation using the renewable energy and a cushioning member provided in the accommodation portion,
   wherein the transportation includes a body portion to be selectively inserted in the accommodation portion, and a wing portion coupled to the body portion to move the body portion, and
   wherein the cushioning member is an air cushion controlled by a controller to alleviate an impact occurring when the transportation lands in the accommodation portion.

2. The charging and storage system of claim 1, wherein at least a portion of the wing portion is formed to be bendable.

3. The charging and storage system of claim 2, wherein the transportation further includes a wing receptacle formed in at least a part of the body portion to selectively accommodate the wing portion therein.

4. The charging and storage system of claim 1, wherein the transportation further includes a storage receptacle formed in at least a part of the body portion to accommodate a storage that stores the renewable energy.

5. The charging and storage system of claim 1, wherein the cabin further includes one or more sensors provided in the accommodation portion.

6. The charging and storage system of claim 5, wherein the one or more sensors detect whether the transportation has landed in the accommodation portion.

7. A charging and storage system for a renewable energy transportation, the system comprising:
   a transportation configured to transfer renewable energy; and
   a cabin configured to charge and store the transportation,
   wherein the cabin includes a support portion for supporting the transportation, an accommodation portion formed in at least a part of the support portion to accommodate the transportation therein, a charging unit provided in the accommodation portion to charge the transportation using the renewable energy, and a locking unit provided in the accommodation portion to fix the transportation to the support portion, and
   wherein the locking unit includes one or more air tubes.

8. The charging and storage system of claim 7, wherein the one or more air tubes are expandable.

9. The charging and storage system of claim 1, wherein the cabin further includes a drain formed through at least a part of the support portion to extend from inside of the accommodation portion to an outside.

10. The charging and storage system of claim 1, wherein the charging unit is configured to charge the transportation wirelessly.

11. A charging and storage method for a renewable energy transportation, the method comprising:
    moving, by a controller, a transportation for transferring renewable energy to a cabin configured to charge and store the transportation;
    determining, by the controller, whether the transportation has landed in the cabin;
    fixing, by the controller, the transportation to the cabin; and
    charging, by a charging unit, the transportation using renewable energy,
    wherein the fixing of the transportation to the cabin includes expanding an air tube provided in the cabin.

12. The charging and storage method of claim 11, further including:
    folding a wing portion configured to move a body portion of the transportation.

13. The charging and storage method of claim 11, wherein the fixing of the transportation to the cabin includes expanding an air tube of a cushioning member provided in an accommodation portion of the cabin, according to a signal of a controller, to alleviate an impact occurring when the transportation lands in the accommodation portion.

* * * * *